Jan. 18, 1966 A. KATZ 3,229,846
TELESCOPING DOMED COVER FOR RECEPTACLES
Filed April 1, 1964 3 Sheets-Sheet 1
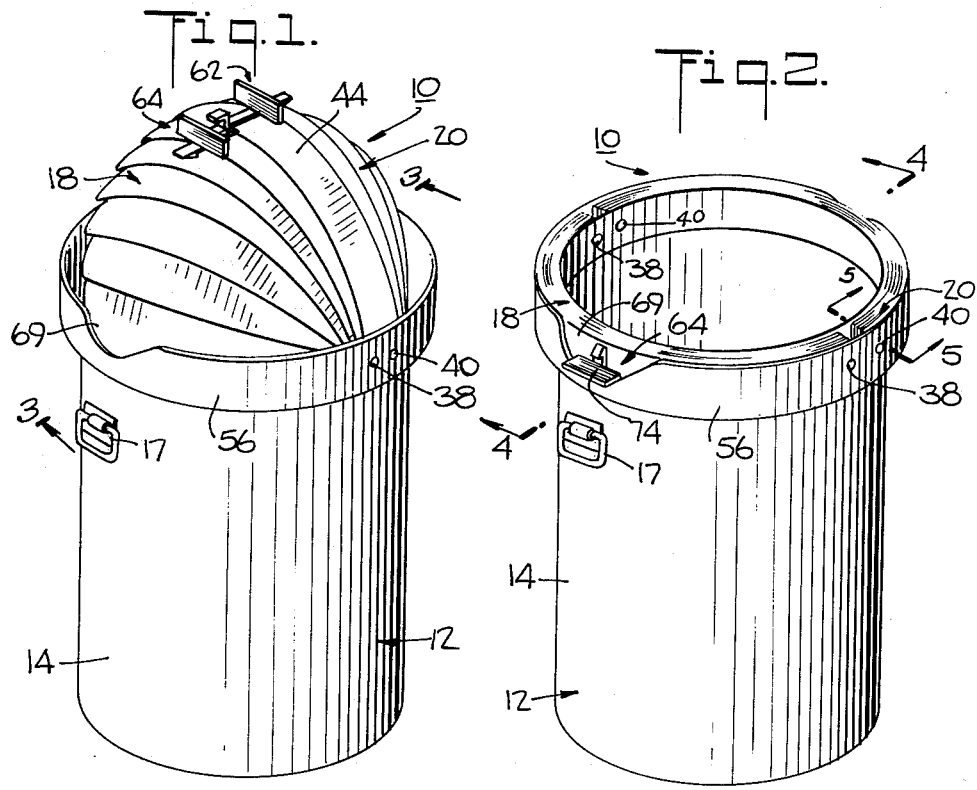
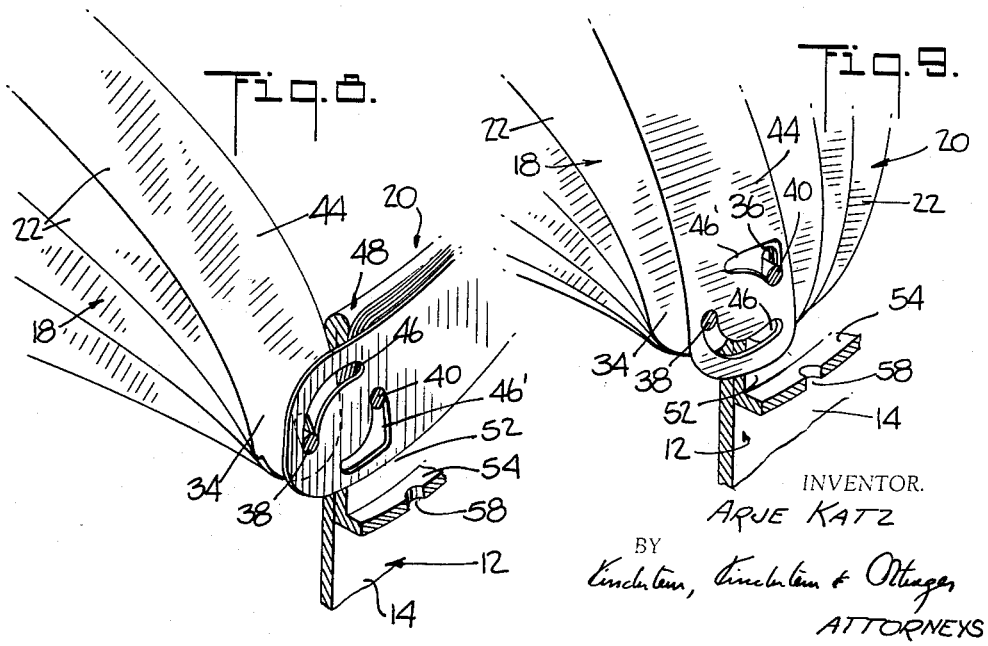
INVENTOR.
ARJE KATZ
BY
ATTORNEYS

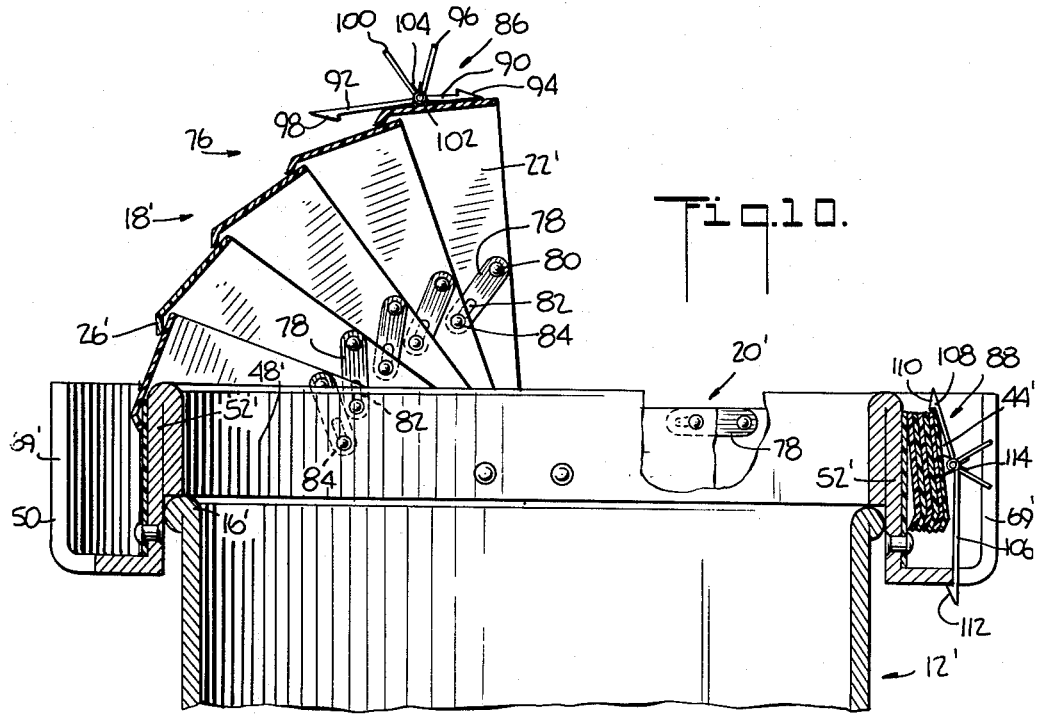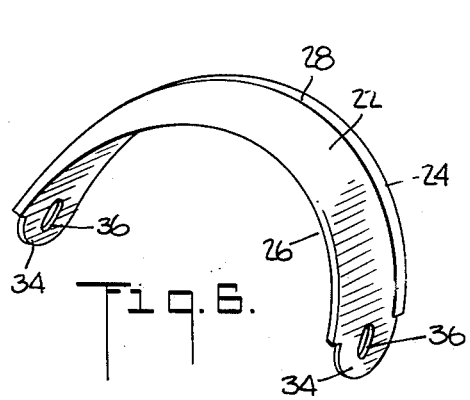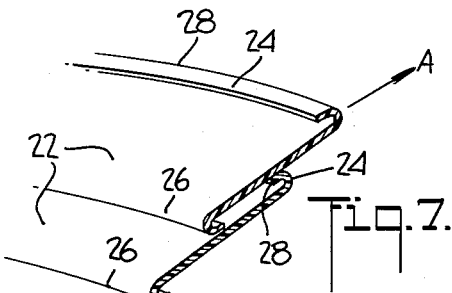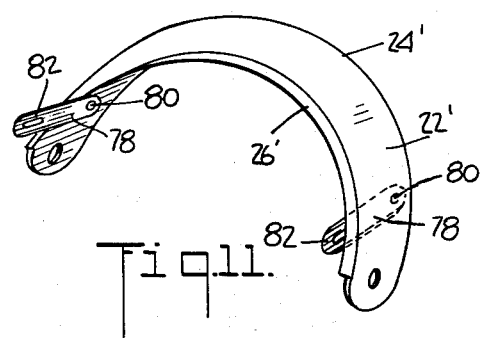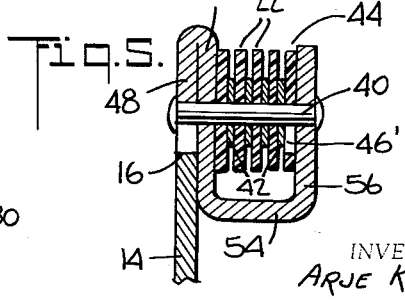
INVENTOR.
ARJE KATZ
BY
ATTORNEYS

United States Patent Office 3,229,846
Patented Jan. 18, 1966

3,229,846
TELESCOPING DOMED COVER FOR
RECEPTACLES
Arje Katz, 1230 44th St., Brooklyn 19, N.Y.
Filed Apr. 1, 1964, Ser. No. 356,383
7 Claims. (Cl. 220—30)

This invention relates to covers for receptacles, and, more particularly, to a telescoping domed cover extensible and collapsible to selectively block or permit access to the circular open mouth of the receptacle.

It is a primary object of my invention to provide a domed cover which can be readily incorporated onto the top of an open mouthed receptacle and which may be easily opened and closed by a user to provide convenient speedy access to the mouth of the receptacle when desired.

It is another object of my invention to provide a domed cover of the character described the leaves of which when the cover is open collapse to a nested position closely adjacent the side wall of the receptacle and thus do not interfere with the normal receiving function of the receptacle.

It is a further object of my invention to provide a domed cover of the character described which when closed securely contains the contents, i.e. refuse and the like, of the receptacle therein so as to guard against spilling of said contents should the receptacle tip, and so as to prevent unwanted rumaging therein as by a small child or by an animal.

It is a further object of my invention to provide an encircling bumper for the domed cover so as to protect the movable leaves of the cover from damage as when the receptacle tips or when two or more receptacles are accidentally pushed sharply together.

It is an ancilliary object of my invention to provide a domed cover of the character described including easily manipulatable latching means so that the cover will remain fixed in either its open or closed position, when so placed by a user thereof.

It is yet another object of my invention to provide a domed cover of the character described comprising two independently pivoted coacting quadraspherical (quarter-spherical) sections whereby the cover is of simple yet rugged construction and is readily shiftable between its open and closed positions.

It is a further object of my invention to provide a domed cover of the character described which can be quickly and sturdily affixed to standard conventional size containers and which may optionally be produced in manufacture as an integral unit with such containers.

Other objects of my invention in part will be obvious and in part will be pointed out hereinafter.

In general, and in accordance with the teaching of my invention, I provide a telescoping domed cover which can be readily quickly affixed to the top of a receptacle having a circular open mouth. Typical use of my invention will be with refuse containers and garbage cans. For this purpose, the domed cover can be manufactured in large sizes for industrial or commercial use, may be manufactured in intermediate sizes for incorporation with outdoor-type garbage cans, and may be produced in smaller sizes for indoor or household type garbage pails which are normally kept in the kitchen.

After a careful reading of the instant disclosure, it will be evident to those skilled in the art that my domed cover can be manufactured and sold separately from any container for later affixation to such container by the user thereof. Thus, the domed covers can be fabricated to fit standard size garbage cans, or other refuse containers. It will thus replace the lids often supplied with such receptacles, which lids are known to become easily broken or damaged, and which are often misplaced or the object of theft. My domed cover can be permanently affixed to a receptacle already in the possession of the homeowner and will thereafter overcome the mentioned defects.

The domed cover may also be sold as an integral part of a container with little or no alteration from its first mentioned separate form. This will of course result in economies in the purchase of the combined product, while at the same time presenting the purchaser with an improved article of commerce.

For these and many other uses, my invention may obviously be adapted to advantage, all of which will be understood to be within the scope of the appended claims.

In the drawings,

FIG. 1 is a three-quartered front perspective view of my telescoping domed cover affixed to the top of a cylindrical receptacle, the domed cover being illustrated in closed position blocking access to the circular mouth of said receptacle;

FIG. 2 is a perspective view similar to FIG. 1, but with the leaves of the domed cover in open nested position permitting access to the circular mouth of said receptacle;

FIG. 5 is an enlarged fragmentary sectional view of the pivot means for the sections of the domed cover, the same being taken substantially along the line 5—5 of FIG. 2;

FIG. 6 is a three-quartered front perspective view of one of several leaves which comprise the sections of the domed cover;

FIG. 7 is an enlarged fragmentary perspective broken-away view of two adjacent interlocking leaves of the domed cover;

FIGS. 8 and 9 are front perspective partially broken-away views of the central leaf and adjacent leaves when the cover is, respectively, in partially closed and fully closed positions;

FIG. 10 is an enlarged fragmentary sectional view of a second embodiment of my telescoping domed cover illustrating one section thereof in open position and the other section in closed position; and FIG. 11 is a three-quartered front perspective view of one of the several leaves which comprise the sections of the second embodiment of my domed cover.

Figure 3:
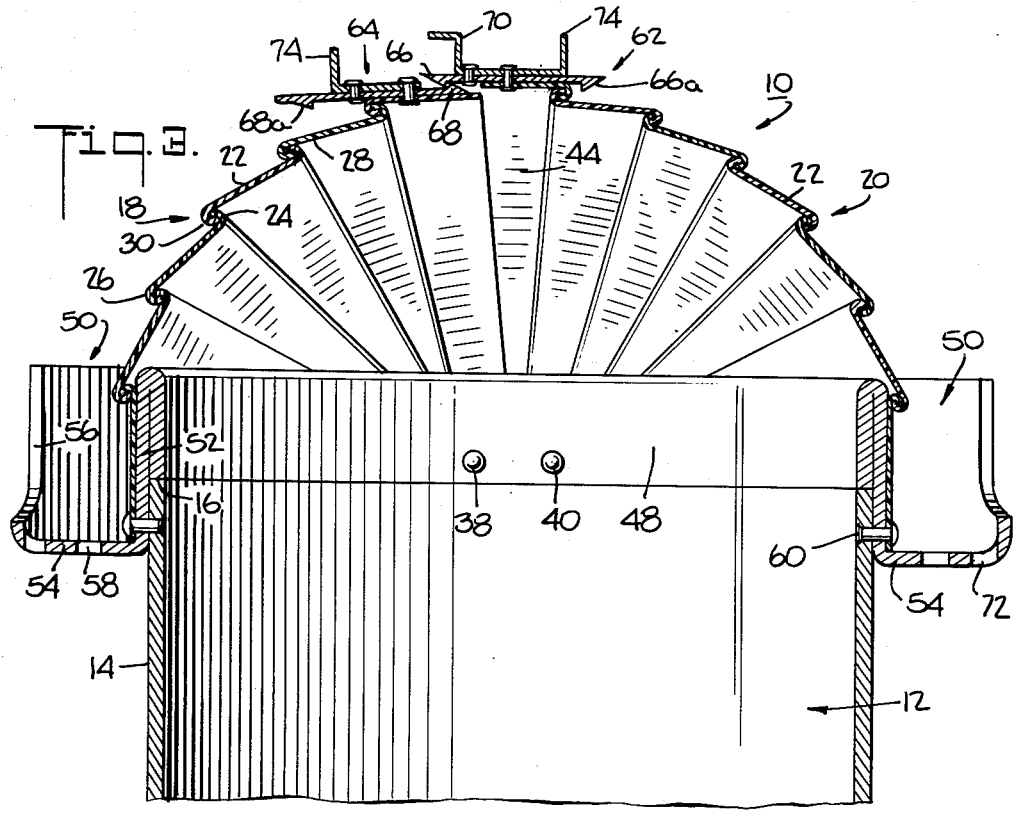
FIG. 3 is an enlarged sectional view of the domed cover taken substantially along the line 3—3 of FIG. 1.

Referring now in detail to the drawings, the reference numeral 10 denotes a telescoping domed cover constructed in accordance with my invention.

The domed cover 10 is used in conjunction with a cylindrical receptacle or container 12. Said container comprises a relatively sturdy vertical wall 14 which has an upper rim 16 that defines an open circular mouth through which access is had to the interior of the receptacle. The domed cover is seated over the open mouth of the receptacle. The container has handles 17 affixed thereto by which it can be carried.

The domed cover 10 includes two sections, designated (as shown in FIGS. 1 and 2) as a left section 18 and a right section 20.

Said sections 18, 20 are of like quadraspherical configuration and cojointly act to define a substantially hemispherical volume when the domed cover 10 is closed. It should be noted at this point that the term "closed" is used herein to designate that position of the domed cover or of its component parts wherein access to the circular mouth of the receptacle is blocked. Likewise, the term "open" as hereinafter used will designate the position of the domed cover wherein the cover and its components are substantially clear of said mouth so as to permit free access to the receptacle.

The approximately hemispherical surface defined by the closed sections 18, 20 has its hypothetical truncated surface parallel to the horizontal plane in which the rim of the receptacle lies, and the approximately hemispherical volume is centered over the top of the receptacle.

The sections 18, 20, which, as has been said, are of like configuration, are mirror, i.e. reverse, images of one another, and when the domed cover is closed each defines an adjacent half of the defined hemisphere, i.e. each section is quadraspherical.

Each of the sections 18, 20 is comprised of several, to wit, at least three, and, as shown, six interlocking overlapping leaves 22. All of the leaves 22 are substantially of like dimensions and contour, the leaves of one section being mirror images of the leaves of the other section. Each leaf 22 is longitudinally curved and its longitudinal center line is a generatrix of the quadraspherical volume defined by the associated section.

One leaf of the several leaves in the left section 18 is illustrated in FIG. 6. As shown therein, each leaf 22 has an elongated leading edge 24 and an elongated trailing edge 26, said edges being coextensive and parallel.

The leaves 22 in each section of the domed cover 10 are interlocked one to another and their edges are overlapped. To this end, the leading edge 24 of each leaf is outwardly and rearwardly turned on itself so as to constitute an elongated front retroverted lip 28. The lip has a terminal portion which is coextensive with and substantially parallel to the body of the leaf but which is spaced therefrom by a distance slightly in excess of the thickness of the material (plastic or sheet metal) from which the leaf is made.

The trailing edge 26 has a similar lip, i.e. a rear lip, 30 which is inwardly forwardly turned. The front lip 28 of one leaf and the rear lip 30 of an adjacent leaf form a uni-directional coupling. As shown in FIG. 7, when one leaf is swung forwardly (in the direction of the arrow "A"), its rear lip 30 will catch the front lip 28 of the next successive leaf at the time the trailing edge 26 of the one leaf is brought into close adjacency with the leading edge 24 of the successive leaf. The leaves uncouple when the said one leaf is reversely moved.

Dual pivot means are provided for expanding and collapsing the sections each a quarter-turn (90°) so that each is readily shiftable between a closed position blocking one half, so to speak, of the mouth of the receptacle 12 and an open position substantially clear of said mouth. In the first-mentioned position, each section is fully expanded into a quadrasphere and only the edges thereof overlap. The front lip 28 of each leaf is coupled with the rear lip 30 of the next preceding leaf, except for the foremost leaves of both sections, which leaves have no front lips.

Figure 4:
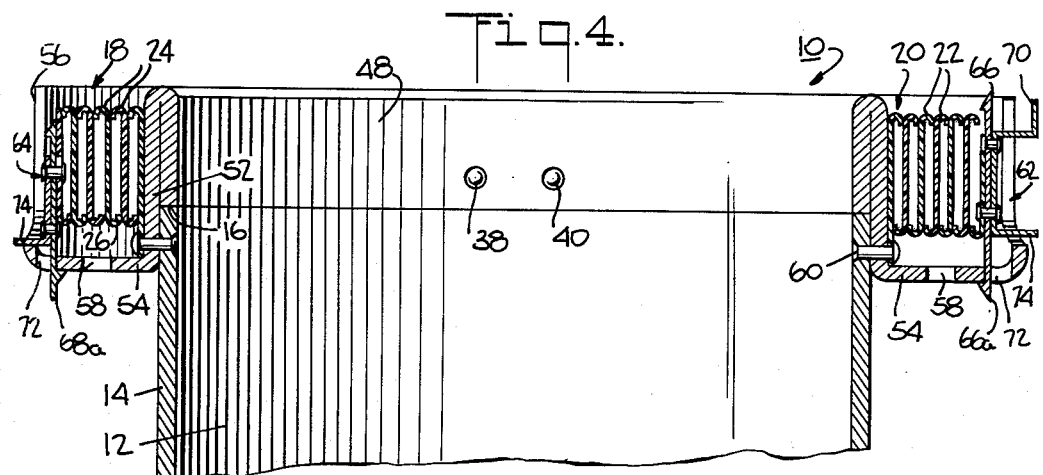
FIG. 4 is an enlarged sectional view of the domed cover taken substantially along the line 4—4 of FIG. 2.

In their open position (see FIG. 2), the leaves of each section are telescoped to a nested position in which they are parallel and closely spaced to one another. In said position, the leaves lie closely adjacent to the vertical wall 14 of the receptacle (see FIG. 4).

Each section of the cover is rotatable independently of the other and is so mounted by one of said pivot means. Said sections are pivoted about closely spaced parallel horizontal axes. For this purpose, each leaf 22 has rounded ends 34 each of which is apertured by a longitudinally elongated slot 36. Each of the pivot means further comprises axially aligned pins, e.g. rivets, which pass through the slots 36 on adjacent leaves and thus permit rotation of the leaves of each section.

More specifically, the left section is pivoted on two aligned rivets 38 (see FIGS. 8 and 9). Each of the rivets is carried by the frame of the domed cover and passes through the slots 36 on adjacent ends 34 of the leaves which comprise said left section. Similarly, the right section 20 is pivoted by two aligned rivets 40. It is evident that by the aforesaid dual pivotal structure, each section of the domed cover is independently shiftable between open and closed position.

Optionally, each end 34 of each leaf in a section is spaced from the leaf end on either side thereof by washers 42, through which the associated rivet also passes (see FIG. 5).

A center leaf 44 is movable from an open position to a position in which it bridges the proximate foremost leaves of the sections 18, 20. That is to say, said center leaf overlies the leading edges of the section leaves 22 which are closest to one another when the domed cover is closed. Said center leaf is rotatable about an axis between and parallel to both of the dual pivot means. For this purpose, as illustrated in FIGS. 8 and 9, each end of the center leaf includes two opposed 90° arcuate slots 46, 46' which define opposite quadrants of a hypothetical circle centered on the center leaf end. One of the rivets 38 of one of the pivot means passes through one of the slots 46 and the other rivet 40 of the second pivot means passes through the other slot 46'. The location of the aforesaid rivets and slots permits the center leaf to rotate about a horizontal axis running between the centers of the mentioned hypothetical circles. One of the center leaf slots, e.g. the slot 46' may be somewhat enlarged to provide easier and non-binding rotative movement of the center leaf.

The trailing edge of the center leaf has a lip-to-lip coupling with the leading edge of the succeeding leaf of the right section, and when the domed cover is closed, the leading edge of the center leaf overlies the leading edge of the foremost leaf of the left section.

The domed cover is supported by an annular frame 48 which comprises a circular vertical wall that lies atop the circular rim 16 of the receptacle 12. All four of the rivets 38, 40 pass through and are supported by said frame.

A bumper 50 is provided on the domed cover 10 to protect the leaves 22 and the pivot means from damage, should the receptacle carrying the domed cover tip or should some heavy object accidentally strike said cover.

Said bumper encircles the domed cover and comprises an annular U-shaped upwardly opening channel which has an inner vertical wall 52 that is integral with the frame 48 and the lower portion of which overlays the upper external surface of the receptacle rim 16. The bumper has a horizontal bottom wall 54 which is integral with and extends outwardly from the bottom edge of the inner wall. The bumper 50 further includes a vertical outer wall 56 which is integral with the outer edge of the bottom wall 54 and which is spaced from and parallel to the inner wall 52. The rivets 38, 40 each have an expanded head located inwardly of the inner wall 52, have their shanks passing through registered apertures in the frame 48, and in the inner and outer walls 52, 56, and have their shank tips enlarged on the external side of the outer wall.

The bumper 50 may have water drain holes 58 located at intervals in the bottom wall 54.

Means is provided for affixing the domed cover 10 to the top of the receptacle. Said affixing means comprises rivets 60 which pass through apertures in a lower portion of the inner wall 52 of the bumper and through registered apertures in the top of the receptacle 12. The aforesaid connection permanently retains the domed cover 10 in its desired position over the open mouth of the receptacle.

The aforesaid rivets 60 also pass through the bottommost leaves in each of the cover sections so as to anchor the bottom of such sections within the bumper and to the frame 48.

Latching means selectively retains the sections in either their open nested position received in the bumper 50 or in the expanded closed position blocking access to the receptacle. Said latching means includes two latches, one latch 62 being carried by the center leaf 44 and the other latch 64 being carried by the foremost leaf of the left section 18. Each of the latches has its center portion affixed to its associated leaf, as by rivets.

The latch 62 is an elongated leaf spring and has integral barbs 66 on both of its ends. The latch 64 likewise is an elongated leaf spring and has barbs 68 on both of its ends.

The latches 62, 64 are interengaged, thereby locking the sections 18, 20 together, by overlaying and thus meshing adjacent barbs 66, 68 on the latches, respectively, 62, 64. The mentioned locking engagement is broken simply by pulling on a small lifting tab 70 on one latch 62 so as to bend its barb 66 away from the adjacent barb 68 on the other latch, and then moving the sections 18, 20 away from one another.

The sections are retained in their open nested position by said latching means. Each latch has a barb 66a, 68a, distant from the previously mentioned interlocking barbs, respectively, 66, 68, which, when the cover is open, passes through and thereafter catches in a strike aperture 72 in the bottom wall 54 of the bumper.

The sections are unlatched by simply flexing the barbs 66a, 68a so that they may pass out through the strike apertures 72. A handle 74 on each latch enables the user to swing the sections, after they are unlatched, to a closed interlocked position. The bumper is cut away, as at 69, to clear the handles in open position.

FIGS. 10 and 11 illustrate a modified embodiment 76 of the domed cover. Only such parts of this embodiment as differ from the first embodiment will be described. Similar parts will be designated by a primed reference number.

The second embodiment is constructed to be seated on the upper beaded rim 16' of a receptacle 12' already in the homeowner's possession. To this end, the lower portion of the annular frame 48' nests on top of the rim and the inner wall 52' of the bumper overlays the rim so that the cover 76 is snugly frictionally held in place.

Each of the sections 18', 20' has its respective leaves 22' interconnected by spaced links 78, two links attaching each leaf to a successive leaf. Each link 78 is pivotably connected at its forward end, as by a rivet 80, to a portion of a leaf 22' adjacent its leading edge 24' and on the interior surface of said leaf.

The other end of each link 78 includes an elongated lost motion slot 82 which extends (when the sections are expanded) beyond the trailing edge 26' of said leaf and overlies a portion of the exterior surface of the next successive leaf. Another rivet 84 on each leaf is slidable in the slot 82.

When the sections are open, the links 78 lie adjacent one another in a horizontal plane (see right section 20' in FIG. 10) and when the sections are expanded to a closed position, the links rotate. The lost motion is taken up in link after link and, thereupon as each pair of adjacent leaves expands to its fullest extent successive leaves will be pulled up (see left section 18' in FIG. 10). The slots are sufficiently long to permit the sections to collapse to the fully open position shown at the right of FIG. 10.

The trailing edges 26' of the leaves are inwardly angled to close the space between the leaves at this zone.

The latch means for the second embodiment 76 of my invention comprises two elongated latches, to wit, a left latch 86 associated with the left section 18' and a right latch 88 associated with the right section 20'.

The left latch 86 is fastened, as by rivets, to the foremost leaf 22' of the left section 18' and comprises two adjacent segments, these being a stationary segment 90 and a rockable segment 92. The stationary segment 90 carries a barb 94 at its end proximate to the right section 20' and includes an upstanding tab 96 at its other end. The rockable segment 92 carries a barb 98 at its end remote from the right section 20' and has a small handle 100 at its end ajacent the tab 96.

The rockable segment 92 is pivoted on upstanding ears 102 secured to the foremost leaf 22' and is biased by a torsion spring 104 to a position flat against the exterior surface of said foremost leaf.

The right latch 88 is similarly constructed except that both of its members are rockable, and to this end includes a somewhat elongated rockable segment 106 and an adjacent shorter rockable segment 108. The free ends of each of the segments 106, 108 carry barbs 110, 112 respectively. Both of the rockable segments 106, 108 are biased by a torsion spring 114 to a position in which their free ends abut the exterior surface of the center leaf 44'.

To hold the sections 18', 20' in their closed position, the barb 110 of the rockable segment 108 of the right latch 88 meshes with the fixed barb 94 of the stationary segment 90 of the left latch 86. To unlock the sections from one another, the rotatable segment 108 is swung upwardly by its handle against the force of the torsion spring 114 so that the barb 110 disengages from the barb 94 on the left latch 86.

Each of the sections 18', 20' is locked in its open nested position by its respective latch 86, 88. To this end, the outer rotatable sements 92, 106 respectively of these latches catches a lower edge of the cutouts 69' in the bumper 50' by the engagement of the outer barbs 98, 112 respectively with the undersurface thereof. Each of the latches can be disengaged from this locked nested position by rotation of the handle portion of the rockable segments 92, 106 so as to clear the barbs from the respective cutouts 69' (see right side of FIG. 10).

It thus will be seen that I have provided domed covers which achieve the several objects of my invention and which are well adapted to meet the conditions of practical use.

As various possible embodiments might be made of the above invention and various changes might be made in the embodiments set forth, it is to be understood that all matter set forth herein or shown in the accompanying drawings is to be interpreted as illustrative and not in a limiting sense.

Having thus described my invention, I claim as new and useful and desire to secure by Letters Patent:

1. A domed cover for a receptacle with an open circular mouth and selectively providing access thereto, said cover comprising two quadraspherical sections of like configuration conjointly substantially defining, when the cover is closed, a hemisphere, each section including several separate overlapping interlocking leaves, dual closely spaced parallel pivot means independently mounting the leaves of each section for telescoping movement between a closed position in which the sections jointly block the mouth of the receptacle and an open nested position substantially clear of said mouth, a bumper located radially outward beyond and encircling the sections in open nested position so as to prevent accidental damage thereto and means for affixing the cover to the receptacle over the mouth thereof.

2. A domed cover for a receptacle with an open circular mouth and selectively providing access thereto, said cover comprising two quadraspherical sections of like configuration conjointly substantially defining, when the cover is closed, a hemisphere, each section including several separate overlapping interlocking leaves, dual closely spaced parallel pivot means independently mounting the leaves of each section for telescoping movement between a closed position in which the sections jointly block the mouth of the receptacle and an open nested position substantially clear of said mouth, a bumper located radially outward beyond the sections in open nested position so as to prevent accidental damage thereto and means for affixing the cover to the receptacle over the mouth thereof.

3. A domed cover as set forth in claim 1 wherein the bumper comprises a U-shaped channel in which the leaves, when the cover is open, are received.

4. A domed cover for a cylindrical receptacle with an open circular mouth and selectively providing access thereto, said cover comprising two quadraspherical sections of like configuration conjointly substantially defining, when the cover is closed, a complete hemisphere, each section including several overlapping imperforate segmentally spherical interlocking self-form-maintaining and individually non-collapsible leaves, only two closely spaced parallel pivot means each one independently mounting all the leaves of a different section at common ends thereof for telescoping movement between a closed quadraspherical position in which the sections jointly block the mouth of the receptacle and an open nested parallel circular position substantially clear of said mouth, each leaf as it moves from open to closed position pulling the next successive leaf after it, each section nesting on a diametrically opposed side of the mouth of the receptacle and the cover, when open, leaving said mouth of the container completely unblocked, and means for affixing the cover to the receptacle over the mouth thereof.

5. A domed cover as set forth in claim 4 wherein there is further provided a frame, the two pivot means mounting the leaves of each section on the frame, and latching means for selectively retaining the sections in either of closed or open positons, said latching means including two sets of coupling members, the frame carrying one member of each set and each section carrying the other member of each set, said other members being engageable either to one another or to the members carried by the frame.

6. A domed cover as set forth in claim 4 wherein the cover further includes a center leaf movable from an open nested position to a position, when the cover is closed, bridging the foremost leaves of the sections, and wherein the pivot means for each of the sections comprises opposed apertures on the ends of each leaf and a pair of opposed stationary pins, each of said pins passing through adjacent aligned apertures in the leaves of a different section, each end of the center leaf having two slots therein, each pin of each pivot means passing through a different slot in said center leaf.

7. A domed cover for a receptacle with an open circular mouth and selectively providing access thereto, said cover comprising a frame, two quadraspherical sections of like configuration conjointly substantially defining, when the cover is closed, a hemisphere, each section including several separate overlapping interlocking leaves, dual closely spaced parallel pivot means independently mounting the leaves of each section on the frame for telescoping movement between a closed position in which the sections jointly block the mouth of the receptacle and an open nested position substantially clear of said mouth, said pivot means comprising opposed apertures on the ends of each leaf and a pair of opposed pins on the frame, each of said pins passing through adjacent aligned apertures in the leaves of each section whereby to rotatably mount said leaves, the apertures in at least some leaves constituting elongated slots, said leaves being shiftable along said slots so as to be movable into closely spaced relationship one within the other when the cover is open, and means for affixing the frame to the receptacle over the mouth thereof.

References Cited by the Examiner

UNITED STATES PATENTS

| 1,143,774 | 6/1915  | Nicholls     | 160—132 |
| 2,080,786 | 5/1937  | Robles       | 220—30  |
| 2,250,729 | 7/1941  | Smith et al. | 220—30  |
| 2,683,507 | 7/1954  | Coven et al. | 312—297 |
| 2,728,115 | 12/1955 | Cornelius    | 160—132 |

FOREIGN PATENTS 1,125,306   3/1962   Germany.

THERON E. CONDON, *Primary Examiner.*